Aug. 25, 1959 W. A. GODDARD 2,901,730

DATA STORAGE APPARATUS

Filed Aug. 29, 1955 4 Sheets-Sheet 1

INVENTOR.
WILLIAM A. GODDARD
BY Lippincott and Smith
ATTORNEYS

Aug. 25, 1959 W. A. GODDARD 2,901,730

DATA STORAGE APPARATUS

Filed Aug. 29, 1955 4 Sheets-Sheet 2

INVENTOR.
WILLIAM A. GODDARD
BY Lippincott and Smith
ATTORNEYS

Aug. 25, 1959 W. A. GODDARD 2,901,730

DATA STORAGE APPARATUS

Filed Aug. 29, 1955 4 Sheets-Sheet 3

INVENTOR.
WILLIAM A. GODDARD

BY Lippincott and Smith

ATTORNEYS

Aug. 25, 1959

W. A. GODDARD 2,901,730

DATA STORAGE APPARATUS

Filed Aug. 29, 1955

4 Sheets-Sheet 4

INVENTOR.
WILLIAM A. GODDARD
BY Lippincott and Smith
ATTORNEYS 2,901,730

DATA STORAGE APPARATUS

William A. Goddard, Los Gatos, Calif., assignor to International Business Machines Corporation, New York, N.Y., a corporation of New York Application August 29, 1955, Serial No. 531,092

4 Claims. (Cl. 340—173)

This invention relates to digital data storage apparatus, and in particular to such apparatus having improved means providing clock and character location signals.

In digital storage apparatus used for information storage in digital computers and the like, and particularly in such apparatus having random-access endless moving storage devices or records, such as rotating magnetic discs or drums, means must be provided for locating selected positions on the record in which certain digital data is to be recorded or found, and for providing clock or timing signals to time and control operation of the recording and read-out apparatus and the associated computing circuits. This has been done in the past by various means, which usually require a record having one or more auxiliary recording channels in which clock and character location signals are stored. In general, such prior-art systems are complex, bulky, and expensive to manufacture and maintain.

Accordingly, a principal object of this invention is to provide digital data storage apparatus having means producing clock and character location signals which is relatively simple, compact, reliable and inexpensive. Other objects and advantages will appear as the description proceeds.

Briefly stated, in accordance with one aspect of this invention, an endless moving digital storage device or record, such as a rotating magnetic disc or drum, has one or more recording tracks logically divided lengthwise into a plurality of character locations within each of which a digital word or character may be recorded. In a serial binary system, for example, each word or character comprises a plurality of bits (binary information elements or digits) arranged in sequence, and consequently each character location is logically divided lengthwise into a plurality of bit or digit locations.

The moving storage device or record is provided with an opaque clock or timing track containing a plurality of small light-transmitting spots, which may be punched holes, therein called character location spots, one of which corresponds to each location on the record in which a word or character may be stored. A stationary opaque mask has a first light-transmitting spot with which each character location spot in succession becomes optically alined as the storage device moves. A light source and a phototube, or other light-responsive electro-optical device, are so arranged that light reaches the phototube momentarily as each character location spot comes into optical alinement with the first stationary spot, in consequence of which an electric pulse is produced for each word or character location.

The stationary mask also has an "optical vernier" including a plurality of alined light-transmitting spots, closely spaced so that the length of the vernier preferably is slightly less than the distance between adjacent character location spots. The number of vernier holes is equal to the number of digit locations within each character location. As the storage device moves, each character location spot, in succession, comes into optical alinement with each of the vernier spots, in succession. Another light source and a second phototube are so arranged that light reaches the second phototube as each character location spot comes into alinement with each of the vernier spots, in consequence of which an electric pulse is produced for each digit location.

The electric pulses so produced are applied to circuits hereinafter described which perform the required character location, timing and control functions of digital data recording or read-out apparatus.

The invention will be better understood from the following description taken in connection with the accompanying drawings, and its scope will be pointed out in the appended claims. In the drawings, Fig. 1 is a schematic plan view of a storage disc or record used in one embodiment of this invention;

Figure 1:
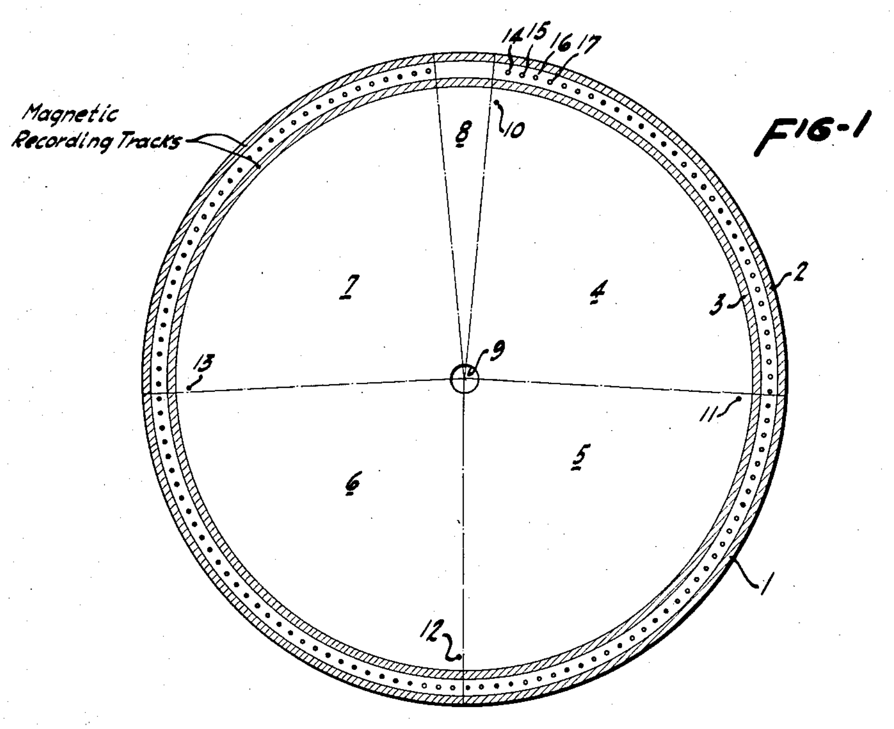

Referring now to Fig. 1 of the drawings, a digital data storage device or record may be a disc 1 having one or more circular recording tracks which are represented in the drawing by double-hatched circles 2 and 3. Alternatively, the storage device or record may be a drum, an endless loop of tape, or other suitable device for storing digital data. Any desired number of recording tracks may be provided, within the space limitations established by size of the record. In a preferred embodiment, information is stored magnetically on disc 1, and for this purpose each of the recording tracks 2 and 3 is a band of magnetic recording material. If desired, the magnetic recording material can cover the entire surface of the disc, or the entire disc may be of magnetic material, in which case the location of the recording tracks is determined by the position of magnetic heads used to record and read out the stored information. Alternatively, information may be stored in the recording channels by photographic means, by punched holes, or by other recording methods.

Preferably, a separate recording and read-out head is provided for each recording track. However, if desired, means may be provided for moving a single head from one track to another, selectively. In the description which follows, it will be assumed that record 1 has only one recording track, but it will be understood that additional recording tracks may be provided whenever desired, by adding additional recording and read-out heads, or by providing means for moving a single head from one track to another. The clock and character location apparatus hereinafter described may be used to time and control any desired number of recording tracks or channels.

In a serial binary digital data processing system, each word or character is represented by a plurality of successive bits which may be recorded sequentially upon a selected small lengthwise portion of a recording track. Accordingly, the physically continuous recording track may be logically divided lengthwise into a plurality of character locations, and each of these character locations may be logically divided lengthwise into a plurality of bit or digit locations. When a character is to be recorded on or read from the record, disc 1 is rotated until the selected character location of the recording track reaches the recording or readout head, and continued rotation of disc 1 causes each digit location within the selected character location to move in sequence past the head. At each of these digit locations, one bit or digit of information is recorded or read.

In high-speed random-access storage apparatus, disc 1 is rotated continuously, and automatic means must be provided for generating control and clock signals when the selected character location is reached and as each digit location passes the recording or read-out head. The present invention is principally concerned with improved means for producing such control and clock signals.

According to one embodiment of the invention, the physically continuous disc 1 is logically divided into five segments identified by reference numerals 4, 5, 6, 7 and 8. Such division is indicated in the drawing by broken lines extending radially outward from a hole 9 in the center of disc 1. Hole 9 fits a spindle for centering the disc on a rotating turntable. Segments 4, 5, 6 and 7 each occupy slightly less than one quadrant of the disc, and divide each recording track into four preferably equal record segments within which information may be stored. No information is stored in the small segment 8, which is provided for reset purposes as hereinafter explained.

Within each record segment in the embodiment illustrated, the recording track is logically divided lengthwise into 32 uniformly spaced character locations, and each character location is logically divided into eight uniformly spaced digit locations, so that one recording track provides space for recording 128 characters each represented by a seven-place binary number, with a blank digit space between successive characters. To record or read data in a selected character location, it is necessary to locate a selected one of the record segments, to locate a selected character location within that segment, and to locate the eight digit locations within the selected character location. This is done in a manner which will now be explained.

Two opaque circular clock or timing tracks are provided on disc 1. The inner one of these clock tracks contains four light-transmitting spots, 10, 11, 12 and 13, which are used for locating a selected one of the record segments. The outer one of the clock tracks contains a much larger number of light-transmitting spots, herein called character location spots, uniformly spaced along a major portion of its length, as shown. Four of these character-location spots are indicated in the drawing by the reference numerals 14, 15, 16 and 17. Each light-transmitting spot may be a small transparent hole, for example, a small hole punched in an opaque disc 1. The clock tracks are simply circular opaque portions of disc 1 which contain the light-transmitting spots herein referred to. If desired, other portions of disc 1 may be transparent, but in magnetic recording systems the entire disc 1, with the exception of the light-transmitting spots, generally is opaque.

The angular spacing of the character-location spots, for example, spots 14, 15, 16 and 17 corresponds to the angular spacing of character locations on the recording track. Preferably, segment 8 contains no character-location spots, for reasons which will become apparent as the description proceeds. However, it should be realized that segment 8 of the clock tracks is not necessarily in the same angular position on the record as segment 8 of the recording tracks, since this will depend upon the relative positions of the recording or read-out head and the electro-optical devices hereinafter described. In other words, each spot of a clock track is displaced in practice from the corresponding location on a recording track by an angular distance equal to the angular displacement between the magnetic head alined with the recording track and the electro-optical device alined with the clock track. Fig. 1 illustrates a case where this displacement is zero. Preferably, reset segments 8 of the clock tracks are wholly opaque; but alternatively, they may be wholly transparent.

Figure 2:
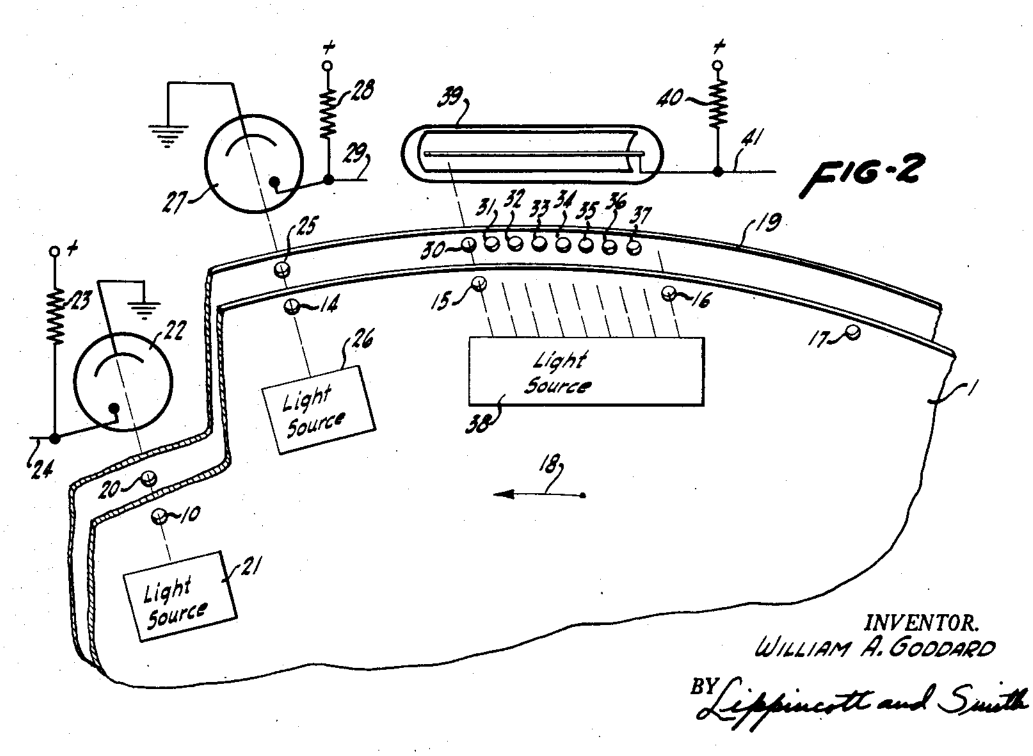
Fig. 2 is a schematic diagram showing one embodiment of an optical system for producing clock and character location signals in accordance with this invention.

Refer now to Fig. 2, which shows one embodiment of the optical system for producing clock and character location signals. A fragment of disc 1 is shown in Fig. 2, it being understood that disc 1 is continuously rotated in the direction indicated by arrow 18 so that different portions of disc 1 move successively into alinement with the optical system. A stationary opaque mask 19 has a light-transmitting spot 20, which may be a small punched hole, in optical alinement with the inner clock track so that the spots 10, 11, 12 and 13 move successively through a position in optical alinement with spot 20.

A light source 21 and phototube 22, or other light-responsive electro-optical device, are arranged so that phototube 22 is illuminated momentarily as each of the spots 10, 11, 12 and 13 passes through a stationary position in optical alinement with spot 20. A broken line between source 21 and phototube 22 in the drawing indicates the optical path of a light ray passing through alined spots 10 and 20. Phototube 22 is connected to a voltage supply, not shown, through a load resistor 23 so that an electric pulse is produced at lead 24 each time that phototube 22 is illuminated. In this way, one pulse is produced at lead 24 each time that disc 1 rotates through an angular distance corresponding to the angular spacing of record segments 4, 5, 6 and 7.

Stationary mask 19 has another light-transmitting spot 25 which is optically alined with the outer clock track on disc 1, so that each of the character location spots (14, 15, 16 and 17, for example) passes in succession through a stationary position in optical alinement with spot 25. A light source 26 and a phototube 27, or other light-responsive electro-optical device, are arranged so that phototube 27 is illuminated momentarily as each of the character location spots passes through the position in optical alinement with spot 25. In the drawing, a broken line between source 26 and phototube 27 indicates the optical path of a light ray passing through alined spots 14 and 25. Phototube 27 is connected to a voltage supply through load resistor 28 so that an electric pulse is produced at lead 29 each time that phototube 27 is illuminated. In this way an electric pulse is produced at lead 29 each time that disc 1 rotates through an angular distance equal to the angular spacing of the character locations on the recording track.

Mask 19 also includes an "optical vernier" consisting of eight uniformly spaced light-transmitting spots 30, 31, 32, 33, 34, 35, 36 and 37, each optically alined with the outer clock track of disc 1. The total length of this "optical vernier" is slightly less than the spacing between successive character location spots on the disc, so that whenever disc 1 rotates through an angular distance equal to the space occupied by one character location, one of the character location spots—spot 15, for example—passes successively through eight stationary positions in optical alinement with respective ones of the spots 30 through 37. A light source 38 and a phototube 39, or other light-responsive electro-optical device, are arranged so that phototube 39 is illuminated momentarily as each of the character location spots on the disc passes through each of the eight positions alined with the eight holes of the "vernier." Preferably, light source 38 produces a relatively wide beam of collimated light rays, represented by broken lines in the drawing.

Phototube 39 is connected to a voltage supply through a load resistor 40, so that an electric pulse is produced at lead 41 each time that phototube 39 is illuminated. The spacing between holes 30 through 37, or, more strictly, the spacing at the eight clock track positions alined with these holes, corresponds to the angular spacing of successive digit locations on the recording track, so that a pulse is produced in lead 41 each time that disc 1 rotates through an angular distance equal to the distance between successive digit locations. Preferably, the spacing between spots 25 and 30 is equal to the spacing between character location spots on the record, so that the character location pulse is coincident with the last in each series of eight digit location pulses.

Accordingly, record segment location pulses are produced at lead 24, character location pulses are produced at lead 29 and digit-location or clock pulses are produced at lead 41, in the manner herein explained.

An important advantage of the optical arrangement described is that light-transmitting spots on disc 1 are required only at positions corresponding to record segment locations and character locations, and additional spots on the rotating disc are not required for the much more numerous digit locations. Consequently, the total number of light-transmitting spots required is relatively small compared to arrangements which require that each digit location be recorded on the record. Greater reliability and substantial savings in manufacturing and maintenance costs are thus achieved. Furthermore, the time interval between successive digit locations or clock pulses is determined by the spacing of holes 30 through 37 in the optical vernier, which can be manufactured economically with a high degree of precision, while the holes in disc 1 can be located with considerably less precision since the blank digit space between characters permits some variation in the character spacings. Accordingly, disc 1 may be an inexpensive paper or plastic disc coated with magnetic material, in which holes are produced by a simple punching operation to form light-transmitting spots. Slight deformations of disc 1, which may be expected in use when inexpensive materials are employed, do not seriously degrade the accuracy of the data storage system.

Figure 3:
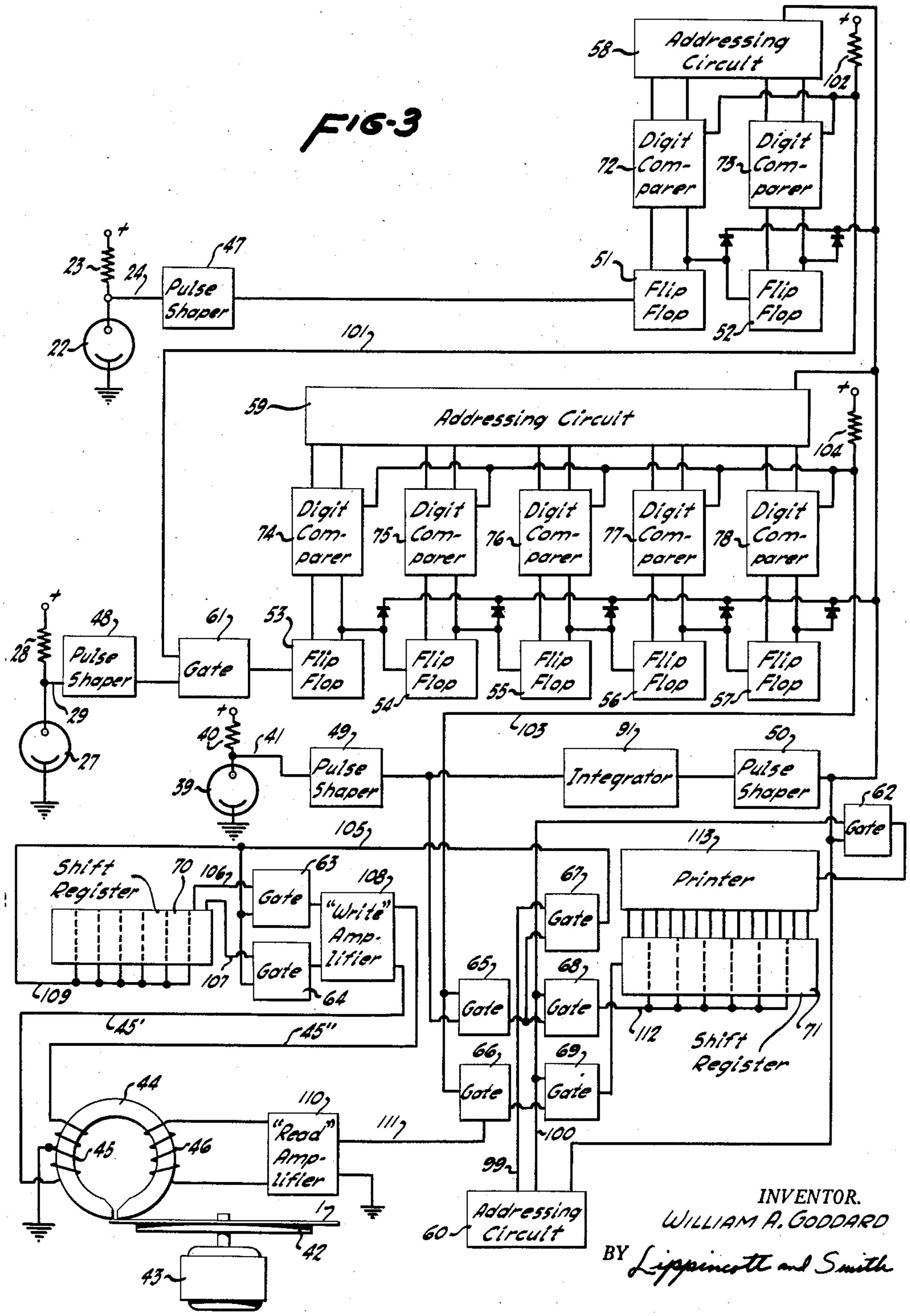
Fig. 3 is a simplified circuit diagram of a data storage appaartus embodying principles of the invention.

Reference is now made to Fig. 3, which is a simplified circuit diagram of data storage apparatus embodying principles of the invention. The recording disc 1 is supported upon a turntable 42 which is continuously rotated by suitable means such as an electric motor 43. A magnetic recording and read-out head 44 is alined with a recording track on disc 1. When data is being recorded on disc 1, currents are supplied to a recording winding 45 through either of two leads 45′ and 45″, selectively, so that each digit location of the recording track is magnetized in either of two magnetic polarities, selectively, to store binary digital information. As previously magnetized portions of the recording track move past head 44, read-out signals are induced in a read-out winding 46 in a manner well known to those skilled in the art. In the embodiment shown, the recording and the read-out circuits are combined into a single unit of equipment, but if desired separate units of equipment may be provided, one unit being used exclusively for recording and the other unit being used exclusively for read-out purposes. It will be understood that the phototubes 22, 27 and 39 are parts of an optical system such as that illustrated in Fig. 2, which for simplicity is not shown in Fig. 3.

Parts of the circuit illustrated in Fig. 3 are shown schematically in block diagram form, in which the blocks represent circuits and devices already known to those skilled in the art, which need not be described in detail for an understanding of the present invention. For example, the pulse shapers 47, 48, 49 and 50 preferably are well known devices for sharpening the waveform of electric pulses. Each of the pulse shapers may be a Schmidt trigger circuit such as is illustrated and described at Fig. 10.3 and pages 92–93 of the book "Automatic Digital Calculators" by Booth and Booth, Butterworths Scientific Publications, London, 1953. The flip-flops 51, 52, 53, 54, 55, 56 and 57 preferably are conventional binary counting elements connected together to form two binary counting registers. Each of the flip-flops may, for example, be a counting element of the type illustrated and described at Fig. 10.6(*b*) and page 95 of the book "Automatic Digital Calculators." The addressing circuits 58, 59 and 60 are devices for supplying operational orders to the data storage apparatus, in a manner herinafter more fully explained, and may comprise various parts of a digital computer which need not be described for an understanding of this invention. For present purposes, it may be assumed that each of the addressing circuits is a binary counting register, composed of binary counting elements or flip-flops, which provides temporary storage for operational orders represented by binary numbers supplied by any suitable means.

The gates 61, 62, 63, 64, 65, 66, 67, 68 and 69 preferably are well known electronic or electro-magnetic devices, each of which except gate 66, will transmit signals from the lower left-hand terminal to the right-hand terminal of the gate only when a relatively high positive potential is supplied to the upper left-hand terminal of the gate. Gate 66 will transmit signals from lead 111 to its right-hand terminal only when a relatively high positive potential is supplied to lead 103. For example, each of the gates may be an anode-output cathode-coupled gate of the type illustrated and described at Fig. 9.11 and page 84 of the book "Automatic Digital Calculators" hereinbefore referred to. Alternatively, other types of gate circuits, many of which are known to those skilled in the art, may be employed, including gates which transmit signals only when a relatively negative voltage is supplied to the upper left-hand terminal of the gate, although the use of such other gates may require some circuit modifications, such as pulse inverting means, which will be obvious to those skilled in the art. Shift registers 70 and 71 may each be seven-place registers of the type illustrated and described at Fig. 11.2 and pages 104–105 of the book "Automatic Digital Calculators," or may each be one of various other types of shift registers.

Each of the digit comparers, 72, 73, 74, 75, 76, 77 and 78 is a device having inputs for receiving two binary signals, one from a counting register of the data storage apparatus and one from an addressing circuit. The digit comparer provides an output signal only when the two input signals are the same. Thus the digit comparers determine when each counting register of the data storage apparatus contains the same binary number as that stored in the associated addressing circuit. A digit comparer of this type can be constructed from a plurality of conventional gates. One type of digit comparer which may be used in the present invention is illustrated in Fig. 4.

Figure 4:
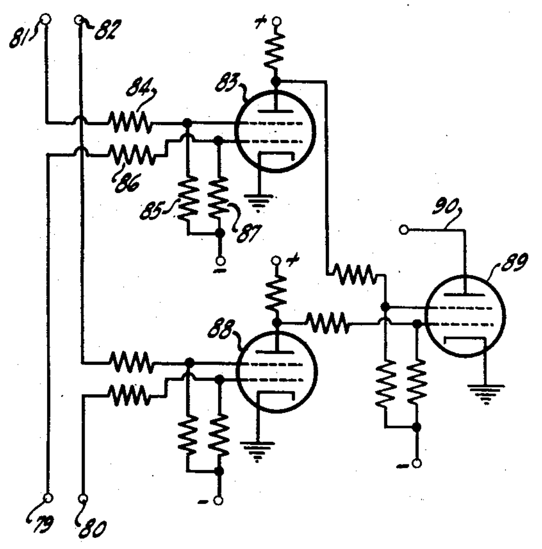
Fig. 4 is a simplified circuit diagram illustrating a digit comparer which may be used in the data storage apparatus.

Referring now to Fig. 4, a digit comparer has a first binary input comprising terminals 79 and 80, and a second binary input comprising terminals 81 and 82. Terminals 79 and 80 are connected to an element of a binary counting register, which may be a flip-flop, so that a relatively high positive voltage is supplied to either one of the terminals 79 and 80, selectively, depending upon the binary numeral stored in the binary counting element. Terminals 81 and 82 are connected to an element of an addressing circuit, which may also be a binary counting element or flip-flop, so that a relatively high positive voltage is supplied to either one of the terminals 81 and 82, selectively, depending upon the binary numeral stored in that element of the addressing circuit. Consequently, a relatively high positive voltage is always supplied to one of each pair of the input terminals. Lower voltages are supplied to the other two input terminals. Assume, for example, that zeros (0) are represented by high positive voltages supplied to terminals 79 and 81, and that ones (1) are represented by high positive voltages supplied to terminals 80 and 82.

A first electronic gate comprises a vacuum tube 83 having a grounded cathode, an anode, and two control grids. One control grid of tube 83 is connected to the tap of a voltage divider 84—85, which is connected between terminal 81 and a negative voltage supply, not shown. The other control grid of tube 83 is connected to the tap of a voltage divider 86—87 connected between input terminal 79 and the negative voltage supply. Tube 83 is conductive only when high positive voltages are supplied to both of the terminals 79 and 81: consequently, tube 83 is conductive only when both input signals represent zero (0). At all other times one or the other of the control grids of tube 83 is sufficiently negative that the tube is nonconductive.

A similar gate comprising a vacuum tube 88 is connected to input terminals 80 and 82 so that tube 88 is conductive whenever both input signals represent one (1). At all other times tube 88 is nonconductive. Accordingly, whenever both input signals represent the same binary numeral, either one or the other of tubes 83 and 88 is conductive: if different binary numerals are represented by the two input signals, both tubes are nonconductive.

Still another gate comprises a vacuum tube 89 having two control grids respectively connected to the anodes of tubes 83 and 88, through voltage dividers as shown. If both of the tubes 83 and 88 are nonconductive, both grids of tube 89 are at relatively positive potentials and tube 89 is sufficiently conductive to provide a low resistance to ground from its anode and the output terminal 90. If either of the tubes 83 and 88 is conductive, one or the other of the control grids of tube 89 is sufficiently negative to cut off tube 89 and to render it nonconductive. Accordingly, the digit comparator is in effect a switch, which provides a low resistance circuit from output terminal 90 to ground whenever the two input signals represent different binary numerals, and which presents a substantially open circuit at output terminal 90 whenever the two input numerals are the same.

In Fig. 3, the output terminals of digit comparers 72 and 73 are connected in parallel, so that a lower resistance circuit to ground is provided through at least one of the digit comparers unless both numerals of the two-place binary number stored in register 51—52 are identical to corresponding numerals of a binary number stored in addressing circuit 58. In the same way, at least one of the digit comparers 74—78 provides a low resistance circuit to ground unless the five-place binary number stored in register 53—57 is identical to the binary number stored in the addressing circuit 59.

The integrator 91, Fig. 3, receives digit location or clock pulses from phototube 39 through pulse shaper 49, and integrates these pulses over a sufficient time interval that a substantially direct-current signal is supplied to pulse shaper 50 during a major portion of each revolution of disc 1. As disc 1 approaches the end of each revolution, a segment 8 of the outer clock track, which, as hereinbefore explained, contains no character location spots, comes into alinement with the "optical vernier" (30—37, Fig. 2) and the generation of clock pulses is interrupted. Integrator 91 now supplies an electric pulse to pulse shaper 50 which acts as a reset pulse in a manner hereinafter explained. Many suitable integrator circuits are known to those skilled in the art, one of which is illustrated in Fig. 5.

Figure 5:
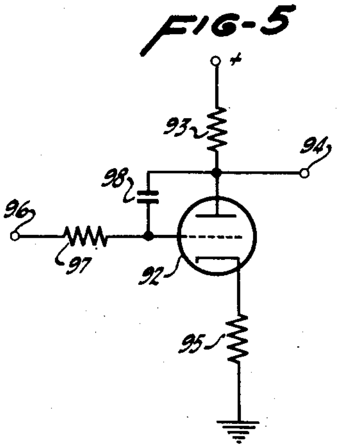
Fig. 5 is a simplified circuit diagram illustrating an integrator which may be used in the data storage apparatus.

Referring now to Fig. 5, a triode vacuum tube 92 has an anode, a cathode and a control grid. The anode is connected to a positive voltage supply, not shown, through a load resistor 93, and is also connected to the output terminal 94 of the integrator. The cathode of triode 93 is connected to ground through a cathode resistor 95. The control grid of triode 92 is connected to the integrator input terminal 96 through a resistor 97. A capacitor 98 is connected between the anode and the control grid of triode 92. When negative pulses are supplied to input terminal 96, the control grid of triode 92 is at a relatively negative potential, and the output terminal 94 is at a relatively high positive potential. Capacitor 98 provides a large amount of degenerative feedback which prevents any sudden change in the control grid potential, so that the voltage supplied to the output terminal 94 is substantially constant. When the supply of clock pulses is interrupted, capacitor 98 begins to discharge through resistor 97, whereupon the potential of the control grid rises and a negative output pulse is produced at terminal 94.

Again referring to Fig. 3, addressing circuit 58 stores a binary number representing a record segment within which selected data is to be recorded or found, addressing circuit 59 stores a binary number representing a character location of the selected record segment within which the data is to be recorded or found, and addressing circuit 60 stores an order that data is to be either recorded or read, selectively. When data is to be recorded on the record 1, addressing circuit 60 supplies a relatively high positive voltage through lead 99 which opens gate 67, while gates 62 ,68 and 69 remain closed. When data is to be read from the record 1, addressing circuit 60 supplies a relatively high positive voltage through lead 100 which opens gates 62, 68 and 69, while gate 67 remains closed.

Now assume that information is to be recorded in the tenth character location of the third record segment of disc 1. An order to record or "write" is stored in addressing circuit 60, which supplies a positive signal through lead 99 and opens gate 67. The number ten is stored in binary form in addressing circuit 59, and the number three is stored in binary form in addressing circuit 58. The data to be recorded is stored as a seven-place binary number in shift register 70. These storage operations are initiated by a digital computer, or in any other desired manner, preferably during the reset interval when record segment 8 is moving past the recording head 44. At this time the counting register comprising flip-flops 51 and 52, and the other counting register comprising flip-flops 53, 54, 55, 56 and 57, have both been reset to zero. Relatively low output voltages are provided by low resistance circuits through the digit comparers so that gates 61, 65 and 66 are closed.

As light-transmitting spots in the outer clock track of disc 1 becomes successively alined with light-transmitting spots in the "optical vernier" of mask 19, phototube 39 is repeatedly illuminated and clock pulses are produced in lead 41. The waveform of these pulses is sharpened by pulse shaper 49 and the clock pulses are integrated by integrator 91 to provide a positive integrator output voltage. The clock pulses are not transmitted through gate 65 at this time, since this gate is closed. Coincident with each eighth one of the clock pulses, phototube 27 is illuminated momentarily to produce a character location pulse which is sharpened by pulse shaper 48, but these pulses art not transmitted through gate 61 at this time since gate 61 is closed.

As spots 10, 11 and 12 come into alinement with spot 20 of the stationary mask, phototube 22 produces record segment location pulses which are sharpened by pulse shaper 47 and supplied to the counting register comprising flip-flops 51 and 52. Before the desired record segment is reached, the number stored in this counting register is different from the number stored in addressing circuit 58, and consequently one or the other of digit comparers 72 and 73 presents a low resistance to ground which keeps the voltage in lead 101 sufficiently low to close gate 61. When three record segment location pulses have been produced by phototube 22, the number stored in the counting register comprising flip-flops 51 and 52 is identical to the number stored in the addressing circuit 58, whereupon both of the digit comparers 72 and 73 present substantially open circuits at their output terminals and a large positive voltage is applied to lead 101 through a resistor 102 connected to a positive voltage supply.

Gate 61 is now opened, and the character location pulses subsequently produced by phototube 27 pass through gate 61 to the binary counting register comprising flip-flops 53 through 57. When ten such pulses have been counted, the binary number stored in register 53—57 is the same as the binary number stored in addressing circuit 59, and all of the digit comparators 74 through 78 present open circuits at their output terminals. A relatively large positive voltage is now supplied to lead 103 through a resistor 104 connected to a positive voltage supply, and gates 65 and 66 are opened. Thus gates 65 and 66 are opened only when the selected record segment and character location have been reached.

After gate 65 opens, subsequent digit location or clock pulses produced by phototube 39 are transmitted through gates 65 and 67 to lead 105. These pulses control the recording apparatus hereinafter described to record in the next seven digit locations of record 1 the binary number previously stored in shift register 70. As soon as this has been done, the next character location spot becomes alined with hole 25, and phototube 27 is again illuminated to produce another character location pulse. This is transmitted to the counting register comprising flip-flops 53 through 57, so that a new number is stored in this counting register which does not correspond to the number stored in the addressing circuit 59. Accordingly, one of the digit comparers 74—78 again presents a low resistance to ground, and gates 65 and 66 are again closed.

Depending upon the numeral stored in the last or right-hand element of shift register 70, the last element or stage of the shift register supplies a relatively high positive voltage through either of the leads 106 and 107, selectively, which opens one of the gates 63 and 64 while the other of these gates remains closed. As soon as the clock pulse is transmitted through lead 105, this pulse passes through the open one of gates 63 and 64 to "write" amplifier 108, which then supplies a current pulse through one of the leads 45′ and 45″, selectively, to record one bit of information on the recording track of disc 1. At the same time, the clock pulse is transmitted through lead 109 to shift register 70, and causes each numeral stored in the shift register to shift one place to the right. Thus the next numeral of the stored binary number is transferred to the last element of shift register 70 so that it will be recorded in the appropriate digit location when the next clock pulse is produced.

As disc 1 approaches the end of a revolution, record segment 8, which has no character location holes, comes into alinement with vernier holes 30—37, and the production of digit location or clock pulses in interrupted. When this happens, integrater 91 produces a reset pulse, as hereinbefore explained, which is sharpened by pulse shaper 50. The reset pulse is supplied to each stage of the counting registers to insure that these registers are reset to zero in prepartion for the next operating cycle. Reset pulses may also be supplied to the addressing circuits, since the addressing orders preferably are changed during the reset interval. If desired, the reset pulses may also be supplied to the shift registers to insure that they are cleared in preparation for the next operation.

Now assume that it is desired to read out data previously recorded at a selected location on disc 1. Numbers representing the selected record segment and character location are stored in addressing circuits 58 and 59 in the manner hereinbefore explained. A "read" order is stored in addressing circuit 60 which supplies a relatively high positive voltage through lead 100 to open gates 62, 68 and 69, while gate 67 is closed. Gates 65 and 66 remain closed until the selected record segment and character location are reached, whereupon gates 65 and 66 are opened in the manner hereinbefore explained.

As each digit location containing recorded data moves past the recording and read-out head 44, voltage signals are induced in read-out winding 46 which are transmitted by "read" amplifier 110 through lead 111 to gate 66. However, gate 66 remains closed and does not transmit these signals until the selected record segment and character location are reached.

When the selected segment and character location are reached, gates 65 and 66 are opened, and the next read-out signal from amplifier 110 is transmitted through gates 66 and 69 to the first stage of shift register 71, so that the recorded binary numeral represented by this signal is stored in the first or left-hand stage of the shift register. As the next digit location is reached, a clock pulse is transmitted through gates 65 and 68 to the shift line 112 of register 71 which shifts all numerals stored in register 71 one place to the right. At the same time, another signal is transmitted through gates 66 and 69 to the first stage of the shift register, so that the next of the recorded binary numerals is stored in the first stage of register 71. When all of the digit locations within the selected character location have passed head 44, the seven recorded numerals will have been stored in shift register 71, and phototube 27 then generates another character location pulse which adds one to the number stored in the counting register comprising flip-flops 53—57. One of the digit comparers 74—78 now becomes conductive and gates 65 and 66 are closed, so that no further signals are transmitted to the shift register 71 during this cycle of operation, and the data read from the selected character location remains stored in shift register 71.

As disc 1 approaches the end of a revolution, a reset pulse is produced by integrater 91 which is transmitted through pulse shaper 50 and gate 62 to a printer 113, or other output device, which prints, records, or otherwise processes the number stored in shift register 71. Printer 113 may be any of a variety of printing devices known to those skilled in the art, and may, for example, comprise printing bars actuated by solenoids to selected ones of which current is supplied by thyratrons having control grids connected to respective stages of shift register 71.

If desired, the record segment locator spots 10, 11, 12 and 13 may be omitted, and a selected character location can be found by counting all of the character location spots beginning with hole 14 at the start of the outer clock track. When this is done, phototube 22, pulse shaper 47 and gate 61 may be omitted. The output of pulse shaper 48 may be connected directly to the input of flip-flop 53, and flip-flop 51 may be connected to flip-flop 57 to form a seven-stage binary counting register comprising flip-flops 53—57 and 51—52. Digit comparers 72—73 may then be connected in parallel with digit comparers 74—78, and addressing circuits 58 and 59 may be combined. However, division of the record into segments in the manner hereinbefore described is advantageous where a single record contains a large number of character locations, since the possibility of incorrect character location through miscount of the character location pulses is thereby reduced.

Figure 6:
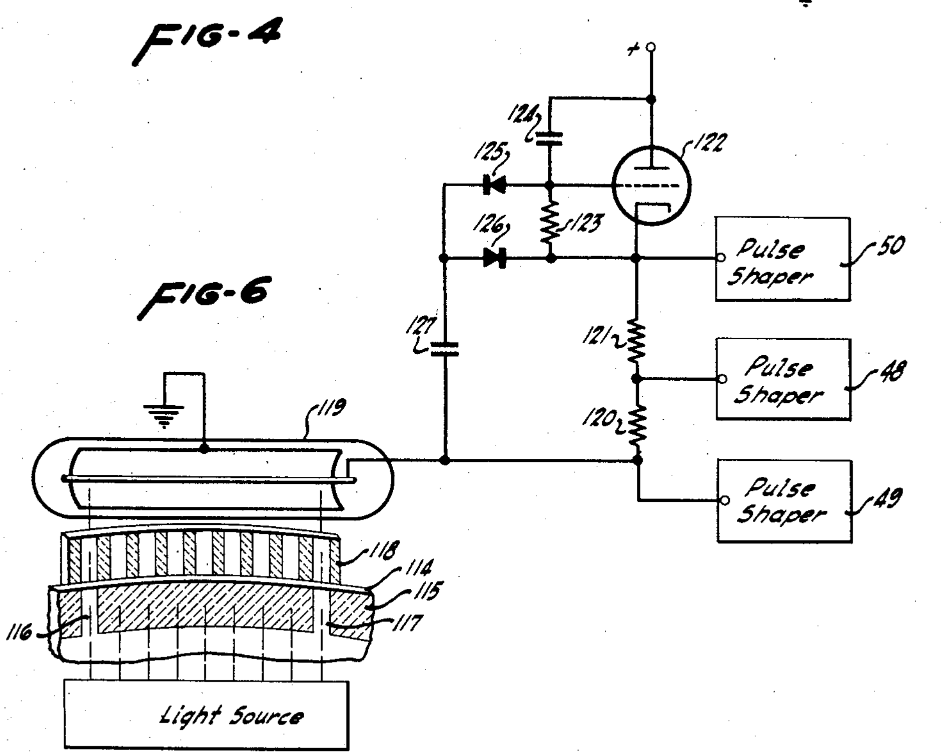
Fig. 6 is a schematic view of an alternative optical system.

Reference is now made to Fig. 6, which shows an alternative optical system for producing character location and digit location pulses. In Fig. 6, wherein parts identical to those hereinbefore described are identified by the same reference numbers, there is shown a fragment of a disc-shaped record 114, which is similar to disc 1 except that the clock tracks may be manufactured in a different manner. In the case of disc 1, the disc preferably is made of an opaque material, such as paper or an opaque plastic, and the character location spots preferably are formed by punching holes in the disc. In the case of disc 114, the disc has a transparent base, such as a disc of a transparent plastic, and an opaque clock track is formed by depositing on this base an opaque coating 115, indicated in the drawing by broken-line hatching. Character location spots, such as spots 116 and 117, are transparent holes formed by gaps or holes in the opaque coating. Opaque coating 115 can be applied by printing, by photographic means, or in other ways such as spraying opaque material through a suitable mask. Since the transparent holes are filled with transparent material, there is less likelihood that the holes will collect dust or other foreign matter than is the case when punched holes are employed. The stationary mask 118 can be manufactured in a similar manner. For similar purposes, the holes of disc 1 in the first embodiment herein described could be filled with transparent plastic material.

Another significant difference between mask 118 and the mask 19 shown in Fig. 2 resides in the position of the spot used for producing character location pulses. In the case of mask 118, the spot used for producing character location pulses is combined with the digit location "vernier," so that a single phototube 119 performs the functions of the two phototubes 27 and 39 shown in Fig. 2. The number of spots in the "vernier" of mask 118 is one greater than the number of digit locations in each character location, and the first and last holes of the "vernier" are spaced apart a distance equal to the spacing of successive character locations. For example, in the case illustrated, where there are eight digit locations in each character location, mask 118 contains nine uniformly spaced transparent holes. As one of the character location spots on record 114, spot 116 for example, passes successively through seven stationary positions in optical alinement with the seven holes in mask 118 exclusive of the first and last holes, phototube 119 is illuminated to produce seven digit location pulses. When spot 116 comes into alinement with the ninth or last one of the holes in mask 118, the next character location spot simultaneously comes into alinement with the first hole in mask 118, so that phototube 119 receives a double amount of illumination and produces a pulse of substantially larger amplitude. Consequently, phototube 119 produces a succession of pulses, of which each eighth one is a large amplitude pulse. These large amplitude pulses are used as the character location pulses in a manner hereinafter explained.

Phototube 119 is connected to a positive voltage supply through a voltage divider comprising resistors 120 and 121 and a vacuum tube 122 connected in series as shown. Vacuum tube 122 preferably is a triode, although multigrid tubes may be used if desired. A grid leak resistor 123 is connected between the control grid and cathode of tube 122, and a capacitor 124 is connected between the control grid and the anode of tube 122. The control grid and cathode are connected through the rectifiers 125 and 126, respectively, to a capacitor 127. The other side of capacitor 127 is connected to the output terminal of phototube 119.

When electric pulses are produced by the phototube alternating current is supplied through capacitor 127 and a rectified current flows through resistor 123 which applies negative bias to the control grid of vacuum tube 122. Whenever the average amplitude of the pulses increases, the amount of negative bias increases, so that the resistance of tube 122 also increases and the phototube supply voltage is reduced. This reduces the amplitude of the output pulses, so that the average amplitude of the output pulses is maintained at a substantially constant value. However, the time constant of resistor 123 and capacitor 124 is such that a single large pulse produces relatively little change in the bias of tube 122, so that the production of larger pulses for character location purposes is not inhibited.

Pulse shaper 49 preferably is connected directly to the phototube output terminal, so that every pulse produced by phototube 119, regardless of amplitude, is transmitted by pulse shaper 49 which supplies digit location or clock pulses in the manner hereinbefore explained. Pulse shaper 48 is connected to a tap between resistors 120 and 121, so that the input pulses to pulse shaper 48 are reduced in amplitude. Accordingly, only the large-amplitude pulses trigger pulse shaper 48, and pulse shaper 48 supplies at its output the required character location pulses.

When the reset segment 8 of the clock track becomes alined with mask 118, the production of pulses by phototube 119 is interrupted since there are no light-transmitting spots in the segment 8 portion of the clock track. When this happens, the negative bias applied to tube 122 decreases substantially to zero, and the cathode of tube 122 becomes more positive. This supplies a reset pulse to pulse shaper 50 so that tube 122 also performs the function of integrater 91 as well as the function of controlling the average amplitude of the pulses produced by phototube 119. If a negative reset pulse is desired, as in Fig. 3 circuit, a pulse inverter can be added, or pulse shaper 50 can be arranged to act as a pulse inverter in a manner well known to those skilled in the art.

Figure 7:
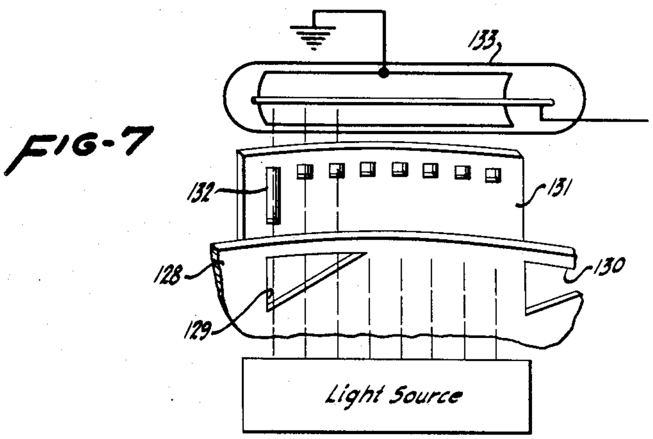
Fig. 7 is a schematic view of another alternative optical system.

Reference is now made to Fig. 7, which shows another alternative optical system for producing digit location and character location pulses. The record 128, a fragment of which is shown in Fig. 7, may be similar to disc 1 except that the character location spots, such as spots 129 and 130, are substantially larger and preferably have a triangular shape with a relatively large abrupt leading edge and a tapered trailing edge, as shown. Mask 131 has a plurality of digit location holes arranged in a manner similar to the optical vernier of mask 19, except that the digit location holes in mask 131 preferably are rectangular in shape, and one of the digit location holes 132 is substantially longer than the other digit location holes, as shown.

Because of the relatively large size of character location spots 129 and 130, light passes through a plurality of the digit location holes simultaneously, so that phototube 133 is continuously illuminated. However, as the abrupt leading edge of each character location spot on the record comes into alinement with an additional one of the digit location holes in mask 131, the amount of illumination reaching phototube 133 increases abruptly, and consequently the phototube produces an output pulse at each digit location. When the leading edge of a character location spot comes into alinement with hole 132, there is an even larger abrupt increase in the illumination of phototube 133, so that a large pulse is produced which may be used for character location purposes in the manner hereinbefore explained. Because of the large size of the character location spots 129 and 130, there is less tendency for these spots to become clogged with dust or other foreign matter, even when they are formed by punching holes through disc 128.

Figure 8:
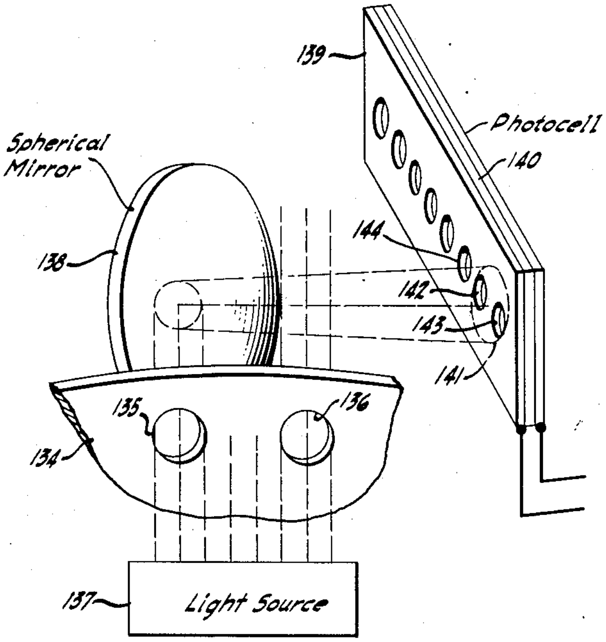
Fig. 8 is a schematic view of still another alternative optical system.

Refer now to Fig. 8, which shows still another alternative optical system for producing digit location pulses. Record 134, a fragment of which is shown in Fig. 8, is similar to disc 1 except that the character location spots, such as spots 135 and 136, may be larger. Illumination from light source 137 which passes through the character location spots in the record is reflected by a spherical mirror 138, or other optical system, onto a mask 139 containing a plurality of digit location holes. The mirror 138, or other optical system, preferably forms enlarged optical images of the character location spots 135 and 136, which move successively across mask 139 as record disc 134 rotates.

Light passing through the digit location holes in mask 139 illuminates a light-responsive photo-electric device, such as photocell 140, which produces a digit location pulse as each of the character location spots passes through each of a plurality of stationary positions in optical alinement with respective ones of the digit location holes in mask 139. Photocell 140 may be either a photovoltaic cell or a photo-conductive cell. For example, cell 140 may be a photo-conductive cell comprising a photoconductive layer sandwiched between two conductive electrodes. Mask 139 may be one of these electrodes, and may be a metal film deposited on the face of the photocell with holes in the film forming the digit location holes. Alternatively, a plurality of small photocells may be arranged in a row to form a structure equivalent to the photocell and mask arrangement illustrated.

The size of character location spots 135 and 136 may be such that more than one of the digit location holes in mask 139 are simultaneously illuminated at certain times. For example, the size of the spots on record 134 may be such that the optical image 141 of hole 135 is large enough to illuminate two digit location holes 142 and 143 when the center of image 141 is midway between holes 142 and 143. As disc 134 rotates, image 141 moves across mask 139 and the illumination of hole 143 is cut off before the next digit location hole 144 is illuminated. In other words, when optical image 141 is centered on hole 142, only one of the digit location holes is illuminated. Consequently, as optical image 141 moves across mask 139, there is a periodic variation in the number of holes illuminated and in the amount of light reaching photocell 140, which produces the digit location pulses. Character location pulses may be produced by any of the means hereinbefore described.

This arrangement is especially advantageous when the spacing of the digit locations is extremely small, since character location spots 135 and 136 may be relatively large compared to the digit location spacing. Since image 141 may be an enlarged image of the character location spots, the digit location holes in mask 139 may also be relatively large, so that manufacture is facilitated and less difficulty is encountered from the deposit of dust and other foreign matter.

In any of the optical systems which have been described, the position of the light source and the light-responsive photoelectric device may be interchanged without materially altering the principles of the invention. Light-transmitting spots of various sizes and shapes may be formed on the record in ways other than those herein specifically described, and may be reflecting spots as well as transparent holes. Additional equivalent electro-optical systems can be devised for producing character location and clock pulses as the character location spots pass selected stationary positions, and many variations can be made in the apparatus for utilizing these pulses without departing from broader ones of the inventive principles herein disclosed.

Accordingly, it will be understood that this invention in its broader aspects is not limited to the specific embodiments herein illustrated and described, and that the following claims are intended to cover all changes and modifications which do not depart from the true spirit and scope of the invention.

What is claimed is:

1. Digital data storage apparatus comprising a moving record upon which digital information may be stored in a plurality of character locations each including a plurality of digit locations, said record having a plurality of transparent holes spaced along its length, the spacing of said holes corresponding to the spacing of said character locations, a stationary mask having a plurality of transparent holes so arranged that each of said holes in the record successively passes through a plurality of stationary positions optically alined with respective ones of said holes in the mask, the spacing of said positions corresponding to the spacing of said digit locations, and electro-optical means producing an electric pulse as each of said holes in the record passes through each of said positions, whereby successive electric pulses are produced as said record moves through successive distances equal to the spacing of successive digit locations.

2. Digital data storage apparatus comprising a moving record having a recording track and an opaque clock track, said recording track having along its length a plurality of character locations each including a plurality of digit locations in which digital information may be stored, said clock track having along its length a plurality of transparent holes, the spacing of said holes in the clock track corresponding to the spacing of said character locations on the recording track, a stationary mask having a plurality of holes optically alined with said clock track so that each of said holes in the clock track successively passes through a plurality of stationary positions optically alined with respective ones of said holes in the mask, electro-optical means producing a character location pulse as each of said holes in the track passes through a selected one of said positions, and electro-optical means producing a digit location pulse as each of said holes in the track passes through each of a plurality of said positions.

3. Digital data storage apparatus comprising a rotating record having a circular recording track and an opaque circular clock track, said recording track having along its length a plurality of character locations each including a plurality of digit locations in which digital information may be stored, said clock track having along its length a plurality of light transmitting spots, the angular spacing of said spots on the clock track corresponding to the angular spacing of said character locations on the recording track, a stationary mask having a plurality of light-transmitting spots optically alined with said clock track so that each of said spots in the clock track successively passes through a plurality of positions optically alined with respective ones of said spots on the mask, electro-optical means producing a character location pulse as each of said spots on the clock track passes through a selected one of said positions, electro-optical means producing a digit location pulse as each of said spots on the clock track passes through each of a plurality of said positions, a normally closed gate which may be opened at selected times, said gate when open transmitting said digit location pulses, pulse counting means counting said character location pulses to determine when a selected character location has been reached, and means controlled by said pulse counting means for opening said gate so that digit location pulses are transmitted only at the selected character location.

4. Digital data storage apparatus comprising a moving endless record upon which digital information may be stored in a plurality of character locations each including a plurality of digit locations, said record having an endless timing track containing a plurality of light transmitting spots uniformly spaced along a portion of its length, said timing track having a reset portion of its length which contains no light-transmitting spots, electro-optical means producing a character location pulse as each of said spots passes a selected stationary position, means producing a digit location pulse as each of said spots passes each of a plurality of selected stationary positions, a counting register for counting said character location pulses to determine when a selected character location is reached, integrating means responsive to said digit location pulses for producing a reset pulse when said reset portion of the control track is reached, and a means responsive to said reset pulse for resetting said counting register.

References Cited in the file of this patent

UNITED STATES PATENTS

| | | |
|---|---|---|
| 1,880,105 | Reifel | Sept. 27, 1932 |
| 2,295,000 | Morse | Sept. 18, 1942 |
| 2,714,843 | Hooven | Aug. 9, 1955 |
| 2,742,631 | Rajchman et al. | Apr. 17, 1956 |

FOREIGN PATENTS

| | | |
|---|---|---|
| 469,809 | Great Britain | Aug. 3, 1937 |

UNITED STATES PATENT OFFICE
CERTIFICATE OF CORRECTION

Patent No. 2,901,730

August 25, 1959

William A. Goddard

It is hereby certified that error appears in the printed specification of the above numbered patent requiring correction and that the said Letters Patent should read as corrected below.

Column 1, line 53, for "therein" read -- herein --; column 2, line 21, for "appaartus" read -- apparatus --; column 3, line 6, for "readout" read -- read-out --; line 11, after "random-access" insert -- data --; column 6, line 2, for "herinafter" read -- hereinafter --; column 7, line 36, for "a lower" read -- a low --; column 8, line 42, for "becomes" read -- become --; line 53, for "art" read -- are --; column 9, line 49, for "in interrupted" read -- is interrupted --; line 54, for "prepartion" read -- preparation --.

Signed and sealed this 1st day of March 1960.

(SEAL)
Attest:

KARL H. AXLINE
Attesting Officer

ROBERT C. WATSON
Commissioner of Patents